US010569328B2

(12) United States Patent
Melekian

(10) Patent No.: US 10,569,328 B2
(45) Date of Patent: Feb. 25, 2020

(54) METHOD OF MAKING AN ASSEMBLY HAVING A CAST IRON SUBASSEMBLY

(71) Applicant: ArvinMeritor Technology, LLC, Troy, MI (US)

(72) Inventor: Joseph Melekian, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 251 days.

(21) Appl. No.: 14/446,709

(22) Filed: Jul. 30, 2014

(65) Prior Publication Data

US 2016/0031005 A1 Feb. 4, 2016

(51) Int. Cl.
| | | |
|---|---|---|
| *B23K 9/00* | (2006.01) | |
| *B23K 35/30* | (2006.01) | |
| *B22D 19/00* | (2006.01) | |
| *B22D 19/16* | (2006.01) | |
| *B23K 9/23* | (2006.01) | |
| *B23K 35/02* | (2006.01) | |
| *B23K 20/08* | (2006.01) | |
| *F16D 65/10* | (2006.01) | |
| *B60B 35/00* | (2006.01) | |
| *B23K 103/04* | (2006.01) | |

(Continued)

(52) U.S. Cl.
CPC ............ *B22D 19/16* (2013.01); *B22D 19/00* (2013.01); *B23K 9/232* (2013.01); *B23K 20/08* (2013.01); *B23K 35/0255* (2013.01); *B23K 35/0261* (2013.01); *B23K 35/30* (2013.01); *B23K 35/306* (2013.01); *B23K 35/3053* (2013.01); *F16D 65/10* (2013.01); *B23K 2103/04* (2018.08); *B23K 2103/06* (2018.08); *B23K 2103/18* (2018.08); *B60B 35/00* (2013.01); *F16D 2200/0013* (2013.01); *F16D 2250/0007* (2013.01); *F16D 2250/0015* (2013.01)

(58) Field of Classification Search
None
See application file for complete search history.

(56) References Cited

U.S. PATENT DOCUMENTS

| | | | |
|---|---|---|---|
| 6,189,413 B1 * | 2/2001 | Morse | B22D 19/00 74/607 |
| 6,744,004 B2 * | 6/2004 | Melekian | B23K 31/02 219/100 |

(Continued)

FOREIGN PATENT DOCUMENTS

| | | | |
|---|---|---|---|
| CN | 102016332 A | | 4/2011 |
| CN | 202463477 U | * | 10/2012 |

(Continued)

OTHER PUBLICATIONS

ASM Handbook, Introduction to Cast Irons, Casting, vol. 15, ASM International, 2008, p. 785-811, (Year: 2008).*

(Continued)

*Primary Examiner* — Devang R Patel
(74) *Attorney, Agent, or Firm* — Brooks Kushman P.C.

(57) ABSTRACT

A method of making an assembly having a cast iron subassembly. The method may include providing a steel insert having a first joining surface and bonding the steel insert to a cast iron part to form a cast iron subassembly such that the first joining surface may be an exterior surface of the cast iron subassembly.

8 Claims, 2 Drawing Sheets

(51) Int. Cl.
  *B23K 103/06* (2006.01)
  *B23K 103/18* (2006.01)

(56) References Cited

U.S. PATENT DOCUMENTS 7,377,598 B2 * 5/2008 Doud .................... B60B 35/003
                                                       180/378
7,518,082 B2    4/2009 Helgee et al.

FOREIGN PATENT DOCUMENTS

| EP | 1679203 A2 | 7/2006 |
| JP | 2010221222 A | 10/2010 |
| WO | 2014168544 A1 | 10/2014 |

OTHER PUBLICATIONS

"Cast Iron", Britannica Academic, Encyclopedia Britannica, Jan. 2010. academic.eb.com/levels/collegiate/article/iron-processing/110659 (Year: 2010).*
European Patent Office, Extended Search Report for the corresponding European Patent Application No. EP15169117.7 dated Jan. 18, 2016.
The State Intellectual Property Office, First Chinese Office Action for the corresponding Chinese Patent Application No. 201510173700.5 dated Feb. 17, 2017.
First Examination Report for Indian Application No. 1030/DEL/2015, dated Apr. 8, 2019, 6 Pages.
The State Intellectual Property Office of the People's Republic of China, Office Action for corresponding Chinese application No. 201510173700.5, dated Oct. 11, 2019.

* cited by examiner

METHOD OF MAKING AN ASSEMBLY HAVING A CAST IRON SUBASSEMBLY

TECHNICAL FIELD

This patent application relates to a method of making an assembly having a cast iron subassembly.

BACKGROUND

A method for arc welding of ductile cast iron is disclosed in U.S. Pat. No. 7,518,082.

SUMMARY

In at least one embodiment, a method of making an assembly having a cast iron subassembly is provided. The method may include providing a steel insert having a first joining surface and bonding the steel insert to a cast iron part to form a cast iron subassembly such that the first joining surface is an exterior surface of the cast iron subassembly. The method may further include providing a steel component having a second joining surface and abutting the second joining surface with the first joining surface. The method may further include joining the cast iron subassembly to the steel component proximate the first and second joining surfaces.

In at least one embodiment, a method of making an assembly having a cast iron subassembly. The method may include providing a first steel insert having a first faying surface and casting a first cast iron part about the first steel insert to make a first cast iron subassembly. The method may further include providing a second steel insert having a second faying surface and casting a second cast iron part about the second steel insert to make a second cast iron subassembly. The method may further include aligning the first faying surface with the second faying surface and welding the first cast iron subassembly along the first faying surface and the second faying surface such that the weld does not extend to and does not carburize the first cast iron part and the second cast iron part.

DETAILED DESCRIPTION

Figure 1:
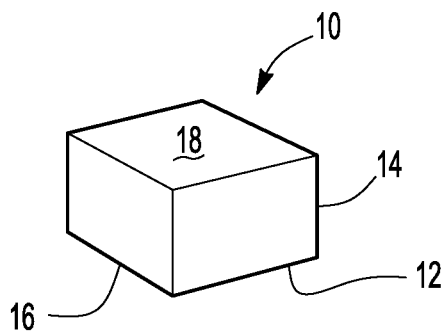
FIG. 1 is a perspective view of a steel insert.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Axle components are generally made of a high strength cast iron due to the high stress and loading experienced by the axle components. The use of a high strength cast iron may enable the creation of the complex shapes of axle components and may minimize machining processes. Such axle components may include axle housings, brake drum assemblies, carrier assemblies, brake calipers, etc. The carbon and silicon content of the cast iron may impact the ability to weld accessories or other components to the axle components to form an axle assembly. The material compositions of flowable cast irons such as Gray Cast Iron, Ductile Cast Iron, and Compacted Graphite Iron are shown in Table 1 below.

TABLE 1

| Material Composition of Various Cast Irons | | | | | |
|---|---|---|---|---|---|
| Iron Family | Carbon (wt %) | Silicon (wt %) | Manganese (wt %) | Sulfur (wt %) | Phosphorous (wt %) |
| Gray Cast Iron | 2.5-4.2 | 1.0-3.0 | 0.15-1.0 | 0.02-0.25 | 0.02-1.0 |
| Ductile Cast Iron | 3.0-4.0 | 1.8-3.0 | 0.10-1.0 | 0.01-0.03 | 0.01-0.1 |
| Compacted Graphite Iron | 2.5-4.0 | 1.5-3.0 | 0.10-1.0 | 0.01-0.03 | 0.01-0.1 |

Gray cast iron is a type of cast iron that may contain a graphitic microstructure. The graphite may be in a flake form and stabilized by the silicon, which may inhibit the development of iron carbides. The graphite in flake form in gray cast iron may result in greater dissolving or diffusing of the graphite throughout the gray cast iron. The dissolving or diffusing of the graphite flakes may result in brittle areas in a part made of gray cast iron.

Ductile cast iron is a type of cast iron that contains a graphitic microstructure. The graphite may be in spheroidal or nodular form. The addition of manganese or magnesium may enable the graphite to take the nodular or spheroidal form. The spheroidal or nodular microstructure may provide a greater strength and enhance ductility as compared to gray cast iron.

A common form of ductile cast iron employed by manufacturers of axle assemblies is SAE J434. SAE J434 may come in various grades acceptable for use with axle assemblies. Some examples of the mechanical properties of SAE J434 grades are shown in Table 2 below.

TABLE 2

| Mechanical Properties of Select SAE J434 Grades | | | | |
|---|---|---|---|---|
| SAE J434 Grade | Hardness Range (HBW) | Tensile Strength (ksi) | Yield Strength (ksi) | % Elongation |
| D400 | 143-170 | 58 | 40 | 18 |
| D450 | 156-217 | 65 | 45 | 12 |
| D500 | 187-229 | 73 | 50 | 6 |

Compacted graphite iron (CGI) is a type of cast iron that contains a graphitic microstructure. The graphite may be in a blunt flake or semi-nodular form. The semi-nodular microstructure may provide strength and ductility intermediate to gray cast iron and ductile cast iron.

The welding of parts made from cast iron may present various problems. The heat produced from welding parts made of cast iron may further dissolve or diffuse the graphite microstructure. The dissolving or diffusing may result in the formation of carbides, martensite, cementite, or bainite proximate the weld. The formations that include cementite may be referred to as "white cast iron". These formations may reduce the strength of the parts made of cast iron. Therefore, industry standards generally warn against the welding of cast irons due to the potential loss of its original strength.

Commonly, cast steel may used to form the axle component and a cast steel accessory component may be welded to the cast steel axle component to form an axle assembly. The cast steel axle component and accessory component may be easily welded together. These accessory components may be brackets, housing snorkels, and other mounting components. Unfortunately, cast steel may have a greater cost than cast irons which may be cost prohibitive in some applications. Traditional manufacturing processes discourage welding of the cast iron axle components so as to not degrade part performance.

A possible solution to obviate the difficulties presented in welding cast iron parts is to provide a steel insert proximate the weld joint areas of the cast iron part. This may enable the welding of high stress components used as part of a vehicle axle assembly. The steel insert may enable non-brittle arc welding to bond a cast iron part to a steel component or other cast iron part, via the steel insert, using a traditional arc welding process.

Figure 2:
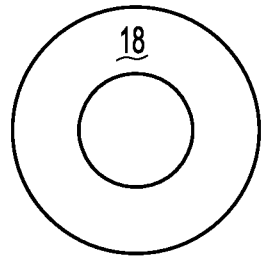
FIG. 2 is a perspective view of another steel insert.

Referring to FIG. 1, the steel insert 10 may be a generally linear strip having tetragonal cross-section. The steel insert 10 may have a width 12, a thickness 14, and a length 16. The thickness 14 may be sized such that a weld does not penetrate past the thickness of the steel insert 10, to not affect the base cast iron parts. A surface of the steel insert 10 may define a first faying or joining surface 18. Referring to FIG. 2, the steel insert 10 may have a generally arcuate profile such that the steel insert 10 is configured as a continuous ring.

The steel insert 10 may be made of a low carbon steel such as SAE 1006, 1008, and 1010. Some examples of possible material compositions of the steel insert 10 are shown in Table 3 below.

TABLE 3

Material Compositions of Various SAE Grades

| SAE Grade | Carbon (wt %) | Manganese (wt %) | Phosphorus (wt %) | Sulfur (wt %) |
|---|---|---|---|---|
| 1006 | 0.08 | 0.35 max | 0.04 | 0.05 |
| 1008 | 0.1 | 0.30-0.50 | 0.04 | 0.05 |
| 1010 | 0.08-0.13 | 0.30-0.60 | 0.04 | 0.05 |

Figure 3A:
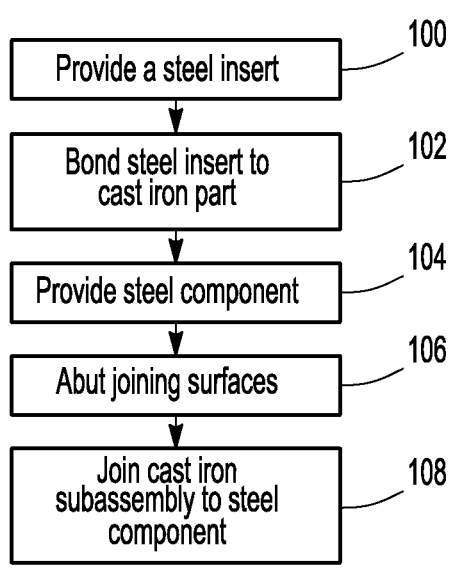
FIGS. 3a and 3b are flowcharts of methods of making an assembly having a cast iron subassembly.
Figure 4A:
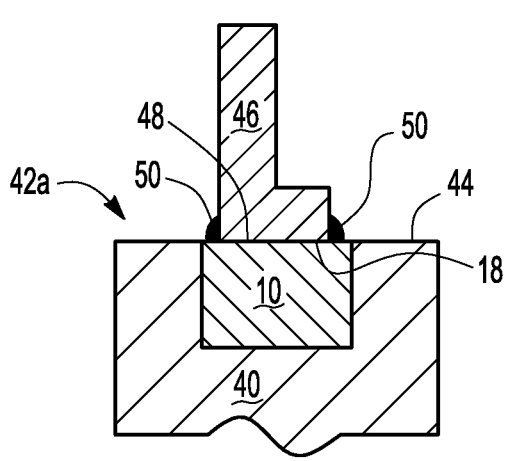
FIGS. 4a and 4b are section views of cast iron subassemblies joined to a steel component.
Figure 4B:
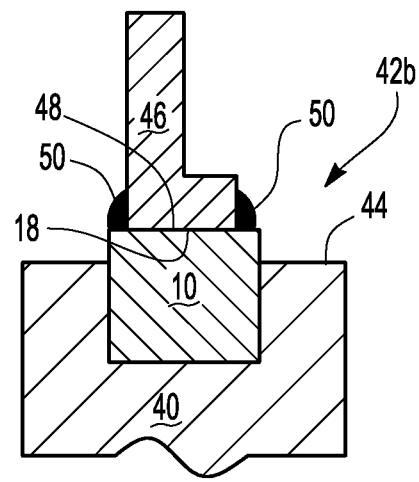

Referring to FIGS. 3a, 4a, and 4b, an exemplary method of manufacturing an assembly having a cast iron subassembly is shown. The steel insert 10, having a first joining surface 18, may be provided, at block 100. The first joining surface 18 may be spaced apart from an opposing mating surface.

At block 102, the steel insert 10 may be bonded to a cast iron part 40. The steel insert 10 may be placed into a mold (not shown) configured to receive the steel insert 10. The mold may permit a flowable cast iron be poured about the steel insert 10 such that the first joining surface 18 may be an exterior surface of the resulting cast iron subassembly. The steel insert 10 may alternatively be bonded to a cast iron part 40 using explosive welding or other known methods to form the cast iron subassembly.

As shown in FIG. 4a, the first joining surface 18 of the steel insert 10 may be flush with a surface 44 of the cast iron part 40 to form a cast iron subassembly 42a. As shown in FIG. 4b, the first joining surface 18 of the steel insert 10 may protrude from the surface 44 of the cast iron part 40 to form a cast iron subassembly 42b.

At block 104, a steel component 46 may be provided. The steel component 46 may be a cast steel bracket, snorkel, or other mounting component having a second joining surface 48.

At block 106, the steel component 46 may be positioned relative to the cast iron subassembly proximately abutting the first and second joining surfaces 18, 48, as shown in FIGS. 4a and 4b.

At block 108, the cast iron subassembly 42a or 42b may be joined to the steel component 46. The cast iron subassembly 42a or 42b may be joined to the steel component 46 proximate the first and second joining surfaces 18, 48 by a non-brittle arc weld 50. The welding process may be performed such that the weld does not penetrate beyond the steel insert thickness 14. This may inhibit the formation of white iron or other carbides within the cast iron subassembly 42a, 42b.

Figure 3B:
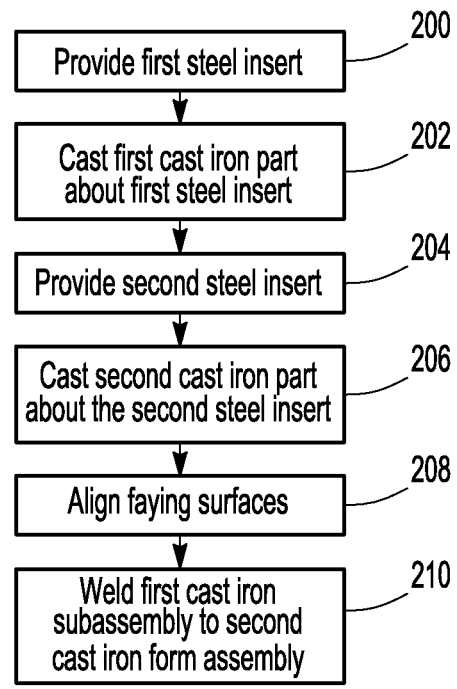
Figures 6A, 6B:
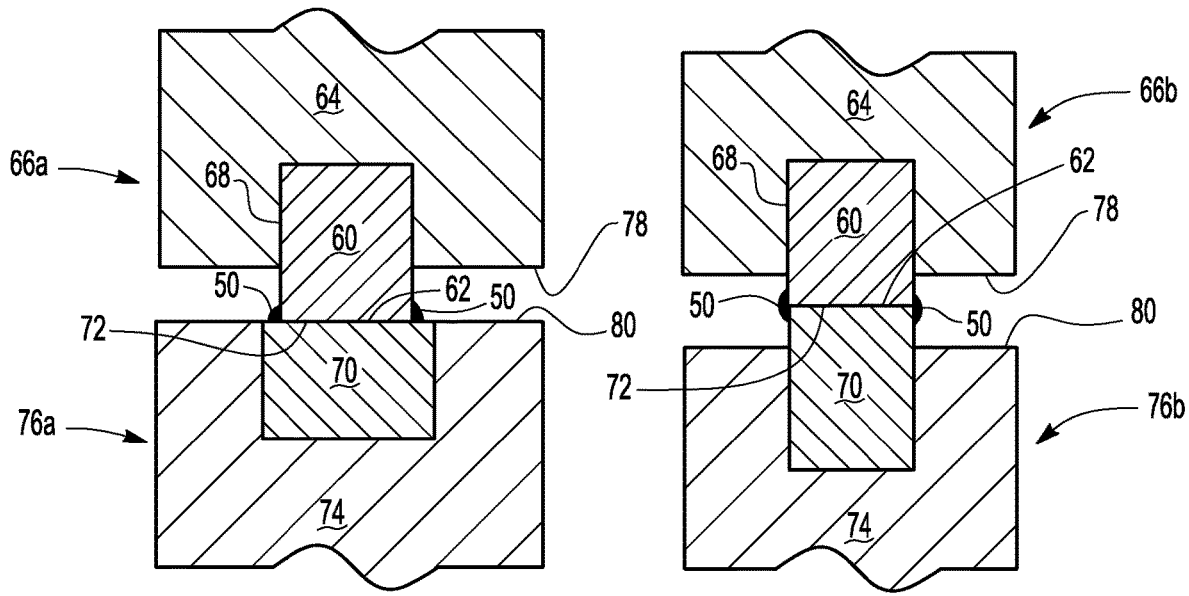
FIGS. 6a and 6b are section views of cast iron subassemblies.

Referring to FIGS. 3b, 6a, and 6b, an exemplary method of making an assembly having multiple cast iron subassemblies is shown.

At block 200, a first steel insert 60 may be provided. The first steel insert 60 may be substantially linear and have a first faying surface 62. The first steel insert 60 may be placed into a mold configured to receive the first steel insert 60.

At block 202, the first steel insert 60 may be cast into a first cast iron part 64 to form a first cast iron subassembly 66a or 66b. A flowable cast iron may be cast about the first steel insert 60 such that the first faying surface 62 is an exterior surface of the first cast iron subassembly 66a or 66b.

The first steel insert 60 may have a first lateral surface 68. The first lateral surface 68 may extend from the first faying surface 62 and into the first cast iron part 64. The first lateral surface 68 may have a length greater than a length of the first faying surface 62 such that the first faying surface protrudes from a surface 78 of the first cast iron subassembly 66a or 66b.

At block 204, a second steel insert 70 may be provided. The second steel insert 70 may be substantially linear and have a second faying surface 72. The second steel insert 70 may be placed into a mold configured to receive the second steel insert 70.

At block 206, the second steel insert 70 may be cast into a second cast iron part 74. A flowable cast iron may be cast about the second steel insert 70 such that the second faying surface 72 may be an exterior surface that may be proximately flush with a surface 80 of the second cast iron part 74 to form a second cast iron subassembly 76a.

As shown in FIG. 6a, the second faying surface 72 of the second steel insert 70 may be proximately flush with a surface 80 of the second cast iron part 74 to form a cast iron subassembly 76a. As shown in FIG. 6b, the second faying surface 72 of the second steel insert 70 may protrude from the surface 80 of the second cast iron part 74 to form a cast iron subassembly 76b.

At block 208, the first cast iron subassembly 66a, 66b may be positioned relative to the second cast iron subassembly 76a, 76b. The cast iron subassemblies may be aligned such that first faying surface 62 is aligned with the second faying surface 72. The first and second faying surfaces 62, 72 may be abutted.

At block 210, the cast iron subassemblies may be welded together along the first faying surface 62 and the second faying surfaces 72 by weld 50.

Figure 5:
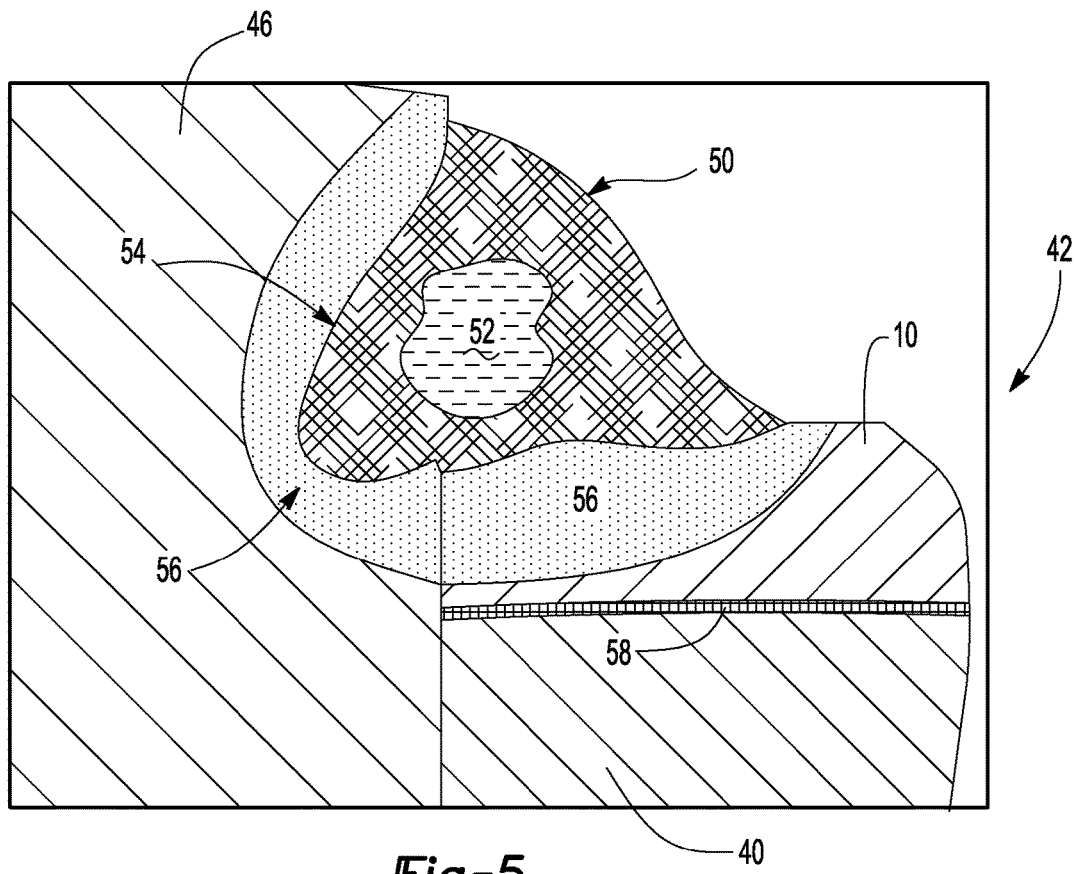
FIG. 5 a magnified cross-sectional view of an assembly.

Referring to FIG. 5, a cross-sectional view of a weld joint is shown. An interface 58 may be created between the steel insert 10 and the cast iron part 40 due to the casting process. The cast iron subassembly 42a, 42b may then be joined to the steel component 46 by a non-brittle arc weld 50.

The weld 50 may generate a weld pool 52. The area immediately adjacent to the weld 50 and the weld pool 52 may define a fusion zone 54 and a heat affected zone 56.

The fusion zone 54 may physically fuse or join the joining surfaces or faying surfaces together. The fusion zone 54 may at least partially melt the interface between the steel insert 10 and steel component 46 or the interface between the first and second steel inserts 60, 70.

During the welding process the cast steel insert 10 and/or the cast steel component 46 may be heated to near their fusion or melting temperature within the heat affected zone 56. The microstructure and the properties of the materials within the heat affected zone 56 may be altered due to the heat generated during the welding process.

The thickness 14 of the steel insert 10 may prevent the heat affected zone 56 from extending into the cast iron part 40 of the cast iron subassembly 42a, 42b so as to affect the material properties of the cast iron part 40. For example, if the cast iron part 40 is formed from ductile cast iron, the heat affected zone 56 may extend into the cast iron part 40. Within the cast iron part 40, an area proximate the fusion zone 54 or within the heat affected zone 56 may not resolidify as ductile cast iron because the graphite may precipitate as quasi-nodular. This non-resolidification may drastically reduce the ductility or strength of the cast iron part 40 formed from ductile cast iron. The cast steel insert 10 may limit the extension of the heat affected zone 56 to inhibit changes in the microstructure properties of the cast iron part 40 so as to not affect the durability or strength of the cast iron subassembly 42a, 42b.

The weld 50 may be performed such that the weld 50 does not extend to or engage the first cast iron part 64 or the second cast iron part 74 of their respective cast iron subassemblies. In addition, the heat affected zone 56 may not extend to the first cast iron part 64 or second cast iron part 74, which may inhibit carburizing or the conversion of the cast iron parts to white cast iron.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making an assembly having a cast iron subassembly, comprising:
    providing a steel insert having a first joining surface;
    bonding the steel insert to a cast iron part to form the cast iron subassembly such that the first joining surface is an exterior surface of the cast iron subassembly;
    providing a steel component having a second joining surface;
    abutting the second joining surface with the first joining surface; and
    joining the cast iron subassembly to the steel component proximate the first and second joining surfaces by welding, wherein the weld obtained by welding generates a weld pool, an area immediately adjacent to the weld and the weld pool defines a fusion zone and a heat affected zone, the heat affected zone does not extend to the cast iron part, and the cast iron of the cast iron part is not converted to white cast iron.

2. The method of claim 1 wherein the weld does not extend to the cast iron part.

3. The method of claim 1 wherein the cast iron part is cast around the steel insert.

4. The method of claim 1 wherein the steel insert is configured as a ring.

5. The method of claim 1 wherein the cast iron part is made of ductile cast iron.

6. The method of claim 1 wherein the steel component is a cast steel bracket.

7. The method of claim 1 wherein the steel insert protrudes from the cast iron part.

8. The method of claim 1 wherein welding produces the heat affected zone in the steel insert and the steel component.

* * * * *